United States Patent
Richardson et al.

(10) Patent No.: US 9,743,414 B2
(45) Date of Patent: Aug. 22, 2017

(54) SECTORIZED BASE STATIONS AS MULTIPLE ANTENNA SYSTEMS

(71) Applicant: QUALCOMM Incorporated, San Diego, CA (US)

(72) Inventors: Thomas J. Richardson, South Orange, NJ (US); Vladimir Parizhsky, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/667,008

(22) Filed: Nov. 2, 2012

(65) Prior Publication Data

US 2013/0301546 A1 Nov. 14, 2013

Related U.S. Application Data

(62) Division of application No. 11/933,390, filed on Oct. 31, 2007, now Pat. No. 8,326,365.
(Continued)

(51) Int. Cl.
*H04M 1/00* (2006.01)
*H04W 72/04* (2009.01)
(Continued)

(52) U.S. Cl.
CPC ........ *H04W 72/048* (2013.01); *H04B 7/0491* (2013.01); *H04B 7/0689* (2013.01);
(Continued)

(58) Field of Classification Search
CPC  H04B 17/0077; H04B 7/0491; H04B 7/0689; H04B 7/0842; H04B 7/06;
(Continued)

(56) References Cited

U.S. PATENT DOCUMENTS 5,490,165 A  2/1996  Blakeney, II et al.
5,625,876 A * 4/1997  Gilhousen et al. ........... 370/331
(Continued)

FOREIGN PATENT DOCUMENTS

CN  1879317 A  12/2006
EP  1505742 A2  2/2005
(Continued)

OTHER PUBLICATIONS

European Search Report—EP13151013—Search Authority—Munich—Jun. 28, 2013.
(Continued)

*Primary Examiner* — Tan Trinh
(74) *Attorney, Agent, or Firm* — Ashish L. Patel

(57) ABSTRACT

Methods and apparatus for improved utilization of air link resources are discussed in wireless communications systems employing multi-sector base stations and wireless terminals with multiple antennas. Timing synchronization is maintained across the base station sectors, and the same set of tones are used in adjacent sectors. In a sector boundary region, which is typically a high interference region, a wireless terminal is set to a sector pair state and operated in a MIMO mode of operation, communicating with two adjacent base station antenna faces of the same base station concurrently, the two different adjacent base station antenna faces corresponding to different adjacent sectors. Thus, typically high interference sector boundary regions, are converted into high capacity regions by having the sectors coordinated and utilizing MIMO techniques.

25 Claims, 11 Drawing Sheets

Related U.S. Application Data

(60) Provisional application No. 60/940,658, filed on May 29, 2007.

(51) Int. Cl.
*H04B 7/0491* (2017.01)
*H04B 7/06* (2006.01)
*H04B 7/08* (2006.01)
*H04L 5/00* (2006.01)
*H04B 17/382* (2015.01)
*H04L 27/26* (2006.01)

(52) U.S. Cl.
CPC ......... *H04B 7/0842* (2013.01); *H04B 17/382* (2015.01); *H04L 5/0023* (2013.01); *H04L 5/0041* (2013.01); *H04L 27/2601* (2013.01)

(58) Field of Classification Search
CPC ...... H04B 7/08; H04B 7/0495; H04B 7/0608; H04B 7/0695; H04L 27/2601; H04L 5/0023; H04L 5/0041; H04W 72/048
USPC ... 455/562.1, 449, 447, 436, 438, 33.3, 101, 455/132, 575.7, 10, 522, 69, 450.1, 63.4; 370/329; 375/132
See application file for complete search history.

(56) References Cited

U.S. PATENT DOCUMENTS

| | | |
|---|---|---|
| 6,813,253 B1 | 11/2004 | Yamaguchi |
| 7,133,380 B1 | 11/2006 | Winters et al. |
| 7,218,948 B2 | 5/2007 | Laroia et al. |
| 7,768,979 B2 | 8/2010 | Sutivong et al. |
| 2002/0063656 A1 | 5/2002 | Gutowski |
| 2002/0071395 A1 | 6/2002 | Redi et al. |
| 2004/0166886 A1* | 8/2004 | Laroia et al. ............... 455/522 |
| 2004/0166887 A1* | 8/2004 | Laroia et al. ............... 455/522 |
| 2005/0069022 A1* | 3/2005 | Agrawal ................ 375/132 |
| 2005/0073973 A1* | 4/2005 | Laroia .................. H04L 1/007 370/329 |
| 2005/0085214 A1 | 4/2005 | Laroia et al. |
| 2005/0124344 A1* | 6/2005 | Laroia et al. ............... 455/436 |
| 2005/0250469 A1 | 11/2005 | Laroia et al. |
| 2005/0272432 A1* | 12/2005 | Ji et al. ................. 455/449 |
| 2006/0052108 A1 | 3/2006 | Laroia et al. |
| 2006/0072524 A1* | 4/2006 | Perahia .................. H04L 25/022 370/338 |
| 2006/0166721 A1* | 7/2006 | Sun ......................... 455/575.7 |
| 2006/0189308 A1 | 8/2006 | Kurata et al. |
| 2006/0258362 A1 | 11/2006 | Jin et al. |
| 2007/0015544 A1 | 1/2007 | Garrett et al. |
| 2007/0149128 A1 | 6/2007 | Das et al. |
| 2007/0149238 A1 | 6/2007 | Das et al. |
| 2008/0013478 A1* | 1/2008 | Rangan .................. H04L 5/0051 370/328 |
| 2008/0025257 A1* | 1/2008 | Laroia et al. ................. 370/329 |
| 2008/0090580 A1 | 4/2008 | Sung et al. |
| 2008/0192682 A1 | 8/2008 | Matsumoto et al. |
| 2008/0304581 A1 | 12/2008 | Bykovnikov |
| 2010/0002659 A1 | 1/2010 | Doi et al. |
| 2010/0035542 A1* | 2/2010 | Fujishima et al. .............. 455/10 |
| 2013/0301436 A1 | 11/2013 | Richardson et al. |

FOREIGN PATENT DOCUMENTS

| | | |
|---|---|---|
| GB | 2422516 A | 7/2006 |
| RU | 2120184 | 10/1998 |
| WO | 9512296 | 5/1995 |
| WO | WO-2004077685 A2 | 9/2004 |
| WO | 2005125262 | 12/2005 |
| WO | 2006077990 A2 | 7/2006 |
| WO | WO-2006125150 A2 | 11/2006 |
| WO | WO-2007023917 A1 | 3/2007 |
| WO | 2007043459 A1 | 4/2007 |

OTHER PUBLICATIONS

European Search Report—EP13153320—Search Authority—Munich—Apr. 5, 2013.
International Search Report—PCT/US2008/064842, International Searching Authority—European Patent Office—Sep. 2, 2008.
Jiang, et al.: "Multiuser MIMO-OFDM Systems using Subcarrier Hopping," Institution of Electrical Engineers Proceedings—Communications, Communications, vol. 153, issue 6, pp. 802-809, Dec. 2006.
Taiwan Search Report—TW097119945—TIPO—Apr. 11, 2012.
Translation of Office Action in Russian application 2009148827 corresponding to U.S. Appl. No. 11/933,390, citing RU2120184 and US20050272432 dated Mar. 24, 2011.
Written Opinion—PCT/US2008/064842, International Searching Authority—European Patent Office—Sep. 2, 2008.

\* cited by examiner

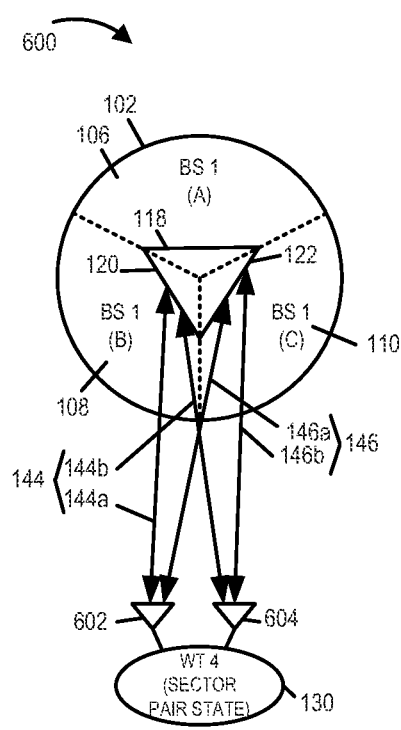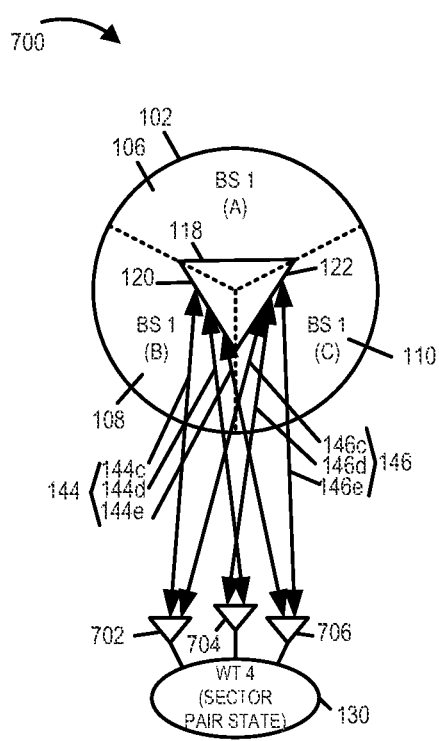
FIGURE 6                    FIGURE 7

SECTORIZED BASE STATIONS AS MULTIPLE ANTENNA SYSTEMS

RELATED APPLICATIONS

The present application is a divisional of U.S. patent application Ser. No. 11/933,390, filed on Oct. 31, 2007, titled "SECTORIZED BASE STATIONS AS MULTIPLE ANTENNA SYSTEM" which claims the benefit of U.S. Provisional Patent Application Ser. No. 60/940,658, filed May 29, 2007 titled "SECTORIZED BASE STATIONS AS MULTIPLE ANTENNA SYSTEMS", both of which are hereby expressly incorporated by reference in their entirety.

FIELD

The present invention relates to wireless communications methods and apparatus and, more particularly, to methods and apparatus for improving utilization of air link resources in a wireless communications system including a sectorized base station.

BACKGROUND

In wireless communications systems sectors are often treated as independent entities. The boundaries between sectors, where receivers receive both sectors at comparable power suffer from the inherent interference. It would be advantageous if methods and apparatus were developed which provided for improved communications in these high interference sector boundary regions.

SUMMARY

In accordance with various embodiments, the notion of a sector boundary is replaced with that of a MIMO enabled region. In the sector boundary region, mobiles have effective access to two base station sectors, and the system can be treated as a MIMO system. When the mobile has two antennas the setup is inherently 2×2, but it could be X×2, where X is the number of antennas the mobile has and X is an integer greater than 2. Thus, in accordance with various embodiments, a high interference sector boundary region is converted in a high capacity region, e.g., a high capacity MIMO region, by having the sectors coordinated.

In some embodiments, a base station operates synchronized sectors, e.g., three synchronized sectors, if in sector boundary regions one takes MIMO view, one likely discovers a notion of soft sectors. Abstractly, the system behaves like 3 base station antenna MIMO but a priori it is known that mobiles typically see only one base station antenna or pairs of base station antennas, e.g., antenna face A, antenna face B, antenna face C or antenna face pair AB, antenna face pair BC, antenna face pair CA—corresponding to six different channel type conditions. A mobile in AB, BC or CA is considered to be in a sector pair state and can be operated to exploit the two sectors as a MIMO system. A mobile that see only a single base station antenna face is considered to be in a sector state and would only have the capabilities supported by that face, e.g., non-MIMO capabilities. Thus the exemplary three sector base station acts more like a big MIMO system with prior knowledge that only the six states are possible, e.g., sector state corresponding to base station antenna face A, sector state corresponding to base station antenna face B, sector state corresponding to base station antenna face C, sector pair state corresponding to antenna face pair AB, sector pair state corresponding to antenna face pair BC, and sector pair state corresponding to antenna face pair CA. Handoff between the six areas is soft and not so critical and typically only between certain pairs. Mobiles that do not have multiple antennas can go into a soft-handoff mode near sector boundaries.

In the uplink a mobile can be assigned in both sectors when in the two sector state, sometimes referred to a sector pair state. Two mobiles can be assigned the same air link resource, e.g., the same OFDM tone-symbols, if at least one of them is in the two sector region, MIMO techniques can be used at the base station to process both signals. To support this, the mobiles should be MIMO aware, i.e., aware of the fact that they are participating in a MIMO transmission.

The system idea is characterized by the existence of MIMO states across sectors and non-MIMO states for mobiles isolated to one sector.

An exemplary method of operating a base station in a sectorized cell will be described in which each sector is adjacent at least one other sector in the cell, adjacent sectors forming sector pairs, said base station being coupled to a multi-face antenna, each face of said antenna corresponding to a different sector of said cell, said sectors being timing synchronized. The exemplary method of operating the base station comprises: for each of a plurality of wireless terminals in said cell, maintaining information indicating whether said wireless terminal is in a sector or sector pair state. The exemplary method of operating the base station further comprises communicating with one of said wireless terminals using a number of antenna faces determined by the state corresponding to said wireless terminal An exemplary base station in a sectorized cell, each sector being adjacent at least one other sector in the cell, adjacent sectors forming sector pairs, said base station being coupled to a multi-face antenna, each face of said antenna corresponding to a different sector of said cell, said sectors being timing synchronized, will be described. The exemplary base station includes: a wireless terminal state information maintenance module for maintaining information indicating whether a wireless terminal is in a sector or sector pair state for each of a plurality of wireless terminals in said cell; and a communications module for communicating with one of said wireless terminals using a number of antenna faces determined by the state corresponding to said wireless terminal.

A method of operating a wireless terminal in accordance with various embodiments includes: maintaining information indicating whether the wireless terminal is in a sector or sector pair state; and communicating with a base station, e.g., a multi-sector base station, in one of a MIMO mode of operation and a non-MIMO mode of operation, the mode of operation used for communicating being a function of whether said maintained information indicates that said wireless terminal is in a sector or sector pair state. In various embodiments communicating with a multi-sector base station in a MIMO mode of operation includes communicating simultaneously with two adjacent base station sector antenna faces using at least some of the same tones, wherein the sectors at the base station are timing synchronized. An exemplary wireless terminal in accordance with various embodiments includes: a state information maintenance module for maintaining information indicating whether said wireless terminal is in a sector or sector pair state; a plurality of antennas; a mode determination module for determining whether said wireless terminal is to operate in a MIMO or non-MIMO mode of operation as a function of said maintained information indicating whether said wireless terminal is in a sector or sector pair state; a MIMO module for communicating with said base station in a MIMO mode of operation; and a non-MIMO mode module for communicating with said base station in a non-MIMO mode of operation.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIGS. 6 and 7 illustrate exemplary MIMO signaling in accordance with various embodiments between a wireless terminal with multiple antennas and abase station utilizing a pair of base station adjacent sector antenna faces.

DETAILED DESCRIPTION

Figure 1:
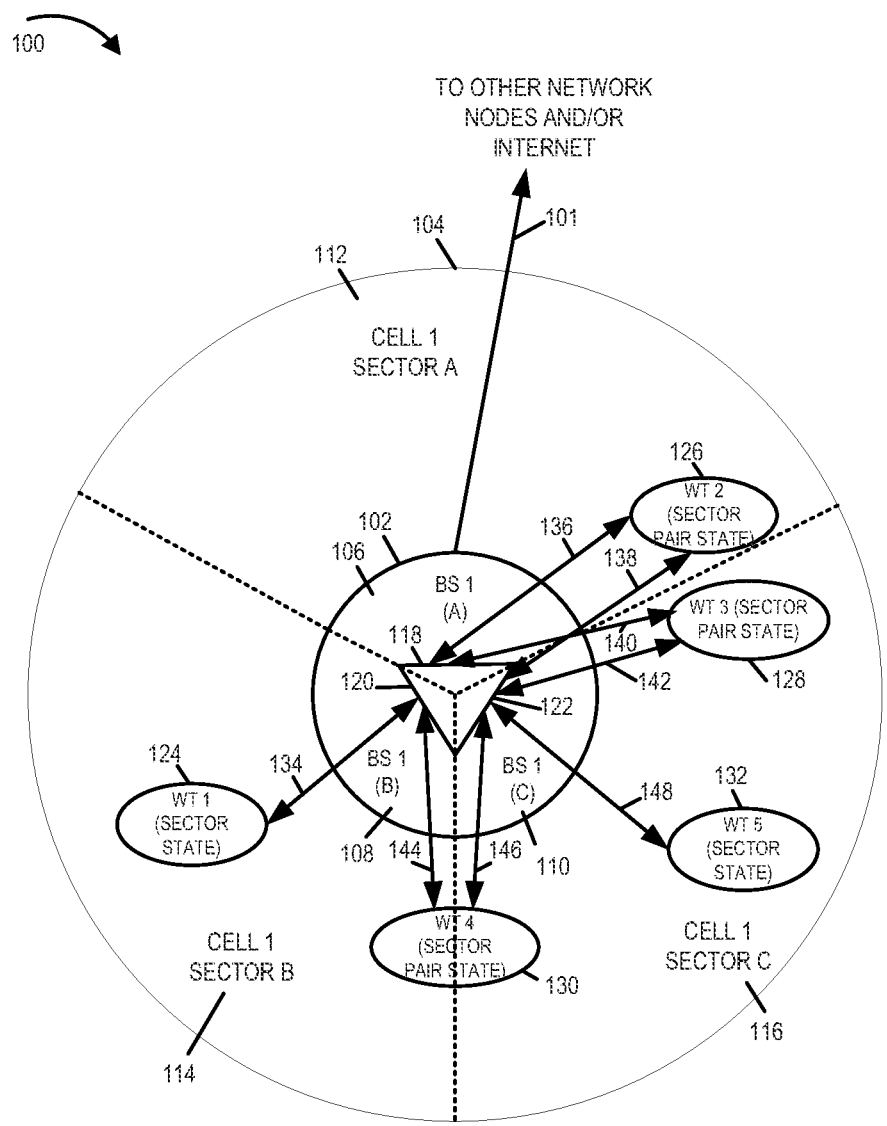
FIG. 1 is a drawing of an exemplary wireless communications system in accordance with various embodiments.

FIG. 1 is a drawing of an exemplary wireless communications system 100, e.g., a multiple access orthogonal frequency division multiplexing (OFDM) wireless communications system in accordance with various embodiments. Exemplary wireless system 100 includes a plurality of base stations including multi-sector base station 1 102. Base station 1 102 is coupled to other network nodes, e.g., other base stations, routers, AAA nodes, home agent nodes, etc., and/or the Internet via network link 101, a fiber optic link. Base station 1 102 has a corresponding cellular coverage area represented by cell 1 104 which includes a sector A region 112, a sector B region 114 and a sector C region 116. Base station 1 102 is a three sector base station including: a base station sector A module 106 which interfaces with sector A antenna face 118; a base station sector B module 108 which interfaces with sector B antenna face 120; and a base station sector C module 110 which interfaces with sector C antenna face 122. Base station 1 102, has synchronized symbol timing with respect to its sectors.

Exemplary wireless communications system 100 also includes a plurality of wireless terminal, e.g., mobile nodes.

In this example, exemplary wireless terminals (WT 1 124, WT 2 126, WT 3 128, WI 4 130, WT 5 132) are currently coupled to base station 1 102 and using BS 1 102 as a point of network attachment. WT 1 is currently in a sector state of operation and is communicating with BS 1 102 via antenna face 120 as illustrated by arrow 134. WE 2 is currently in a sector pair state of operation and is communicating with BS 1 102 via antenna face 118 as illustrated, by arrow 136 and via antenna face 122 as indicated by arrow 138. WT 3 is currently in a sector pair state of operation and is communicating with BS 1 102 via antenna face 118 as illustrated by arrow 140 and via antenna face 122 as indicated by arrow 142. WT 4 is currently in a sector pair state of operation and is communicating with BS 1 102 via antenna face 120 as illustrated by arrow 144 and via antenna face 122 as indicated by arrow 146. WT 5 is currently in a sector state of operation and is communicating with BS 1 102 via antenna face 122 as illustrated by arrow 148.

Now consider an example, WT 2 and WT 3 are both in a sector pair state corresponding to same sector pair. BS 1 102 may, and sometimes does, allocate the same tones to be used concurrently in both sector A and sector C by both WT 2 and WT 3 for at least some signaling. WT 4 130 is in a sector pair state and WT 5 132 is in a sector state. BS 1 102 may, and sometimes does, allocate the same tones to be used concurrently in sector C by WT 5 132 and by WT 4 130. WT 4 130 is in a sector pair state and WT 1 124 is in a sector state. BS 1 102 may, and sometimes does, allocate the same tones to be used concurrently in sector B by WT 4 130 and by WT 1 124.

The wireless terminals in a sector pair state, e.g., wireless terminal 4 130, includes a plurality of antennas and are communicating in a MIMO mode of operation with the base station 102. FIGS. 6 and FIG. 7 provide more detailed exemplary illustrations. The sectors of the base station 102 are symbol timing synchronized facilitating such operations.

Figure 2:
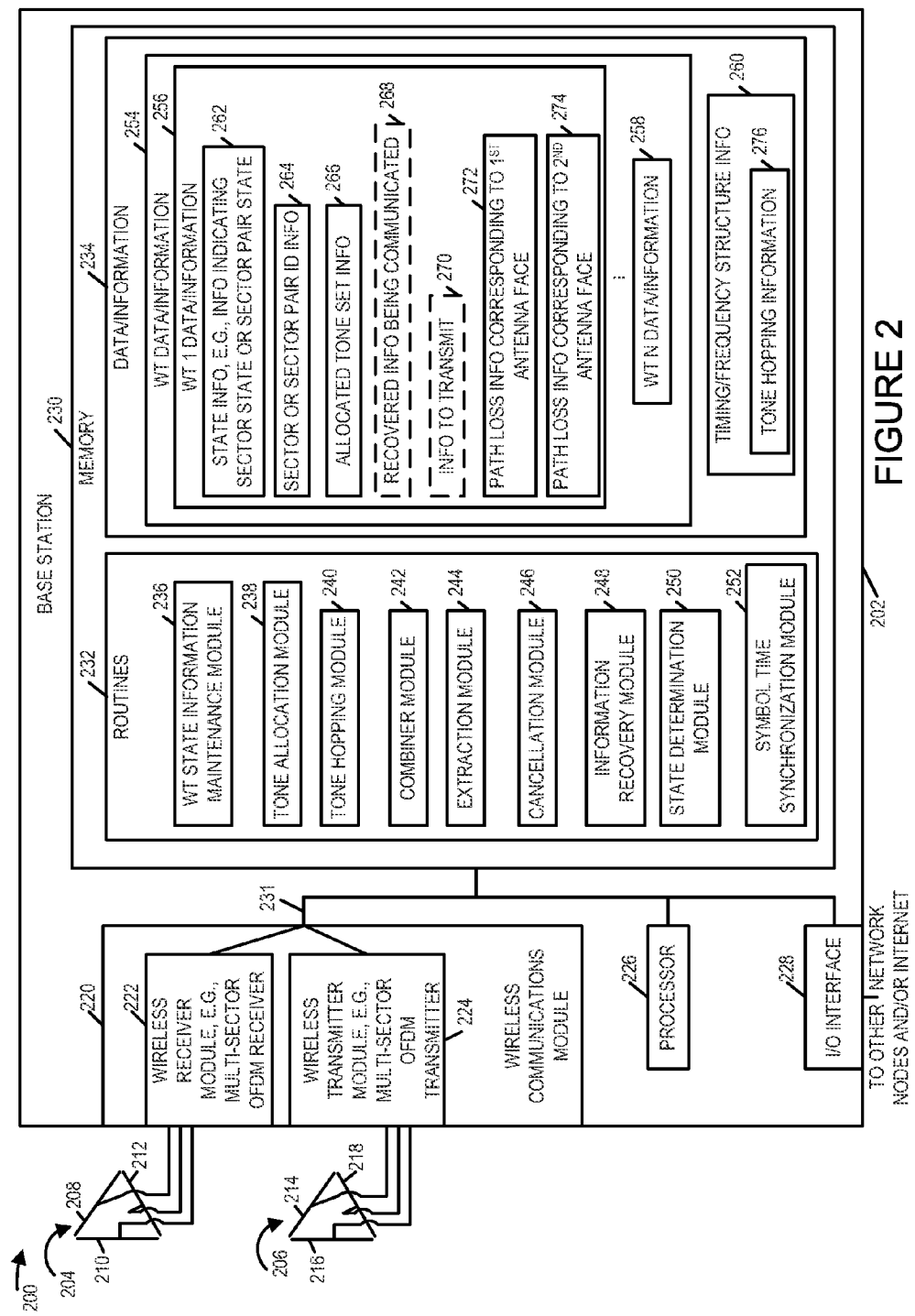
FIG. 2 is a drawing of an exemplary base station coupled to a multi-face receive antenna and a multiple face transmit antenna in accordance with various embodiments.

FIG. 2 is a drawing 200 of an exemplary base station 202 coupled to a multi-face receive antenna 204 and a multiple face transmit antenna 206 in accordance with various embodiments. In some embodiments, the same antenna is used for receive and transmit signaling. In this exemplary embodiment base station 200 is a three sector base station; however in other embodiments, the base station includes a different number of sectors, e.g., two, four, five, six, or more than six.

Exemplary base station 202 includes a wireless communications module 220, a processor 226, an I/O interface 228 and a memory 230 coupled together via a bus 231 over which the various elements may interchange data and information. Memory 230 includes routines 232 and data/information 234. The processor 226, e.g., a CPU, executes the routines 232 and uses the data/information 234 in memory 230 to control the operations of the base station 202 and implement methods, the method of flowchart 400 of FIG. 4.

Wireless communications module 220 communicates with a plurality of wireless terminals, wherein communication with an individual wireless terminal uses a number of faces determined by the state corresponding to the wireless terminal For example, if the communication is uplink communication and the wireless terminal being communicated with is in a sector state, one antenna face of receive antenna faces (208, 210, 212) is used; however if the wireless terminal in a sector pair state 2 adjacent receive antenna faces are used which is one of receive antenna face pairs (208, 210), (210, 212) and (212, 208). Continuing with the example, if the communication is downlink communication and the wireless terminal being communicated with is in a sector state, one antenna face of transmit antenna faces (214, 216, 218) is used; however if the wireless terminal in a sector pair state 2 adjacent transmit antenna faces are used, which is one of transmit antenna face pairs (214, 216), (216, 218) and (218, 214).

Wireless communications module 220 includes a wireless receiver module 222 and a wireless transmitter module 224. The wireless receiver module 222, e.g., a multi-sector OFDM receiver, is coupled to multi-face receive antenna 204 via which the base station receives uplink signals from wireless terminals. Multi-face receive antenna 204 is a three face receive antenna, each face (208, 210, 212) of said antenna 204 corresponding to a different sector of a cell. In this exemplary embodiment, the sectors are timing synchronized. Consider that receive antenna face (208, 210, 212) corresponds to sector (A, B, C), respectively. Antenna faces (208, 210) correspond to a first sector pair of (sector A and sector B); antenna faces (210, 212) correspond to a second sector pair of (sector B and sector C); antenna faces (212, 208) correspond to a third sector pair of (sector C and sector A). Wireless receiver module 222 receives uplink signals from wireless terminals. Receiver module 222 receives a signal using the same set of tones from two adjacent antenna faces. Operations of receiver module 222 include receiving a signal on a first set of tones from first antenna face, e,g., antenna face 208, corresponding to the first sector, and concurrently receiving a signal on the first set of tones from the second antenna face, e.g., antenna face 210, corresponding to the second sector.

Receiver module 222 also receives from a wireless terminal path loss information corresponding to multiple adjacent sectors. For example, receiver module 222 receives path loss information corresponding to a first antenna face in antenna face pair and path loss information corresponding to a second antenna face in the antenna face pair. For example, a wireless terminal may be situated in a region such that it can receive downlink signals from both transmit antenna face 214 and transmit antenna face 216, and the wireless terminal receives pilot channel signals from each antenna face (214, 216) and generates a channel condition feedback report conveying path loss information, which is transmitted in uplink signals and received by receiver module 222. In some embodiments, the received path loss information is a power measurement of a signal transmitted on a tone during a period of time during which the adjacent antenna face does not transmit on the same tone. For example, in one exemplary embodiment, at least one pilot tone signal transmitted into a first sector via one transmit antenna face corresponds, in time and frequency, to an intentional transmit null in a second sector, the first and second sectors being adjacent; and at least one pilot tone signal transmitted into the second sector via a second transmit antenna face, said second antenna face being adjacent said first antenna face, corresponds, in time and frequency, to an intentional transmit null in said first sector.

The wireless transmitter module 224, e.g., a multi-sector OFDM transmitter, is coupled to multi-face transmit antenna 206 via which the base station transmits downlink signals to wireless terminals. Multi-face transmit antenna 206 is a three face transmit antenna, each face (214, 216, 218) of said antenna 206 corresponding to a different sector of a cell. In this exemplary embodiment, the sectors are timing synchronized. Consider that transmit antenna face (214, 216, 218) correspond to sector (A, B, C), respectively. Antenna faces (214. 216) correspond to a first sector pair of (sec(or A and sector B); antenna faces (216, 218) correspond to a second sector pair of (sector B and sector C); antenna faces (218, 214) correspond to a third sector pair of (sector C and sector A). Operations of wireless transmitter module 224 include transmitting downlink signals to wireless terminal. For example, the transmitter module 224 can, and sometimes does, transmit the same information from each of the antenna faces of a sector pair, e.g., antenna faces 214, 216, to a first wireless terminal. During some times, the transmitter module 224 transmits different information to first and second wireless terminals using the same set of tones and using both antenna faces of antenna pair at the same time, said first and second wireless terminals each being in a sector pair state.

Routines 232 include a wireless terminal state information maintenance module 236, a tone allocation module 238, a tone hopping module 240, a combiner module 242, an extraction module 244, a cancellation module 246, an information recovery module 248, a state determination module 250, and a symbol time synchronization module 252. Wireless terminal state information maintenance module 236 maintains information indicating whether a wireless terminal is in a sector or sector pair state for each of a plurality of wireless terminals in the base station's cell which are using the base station as a point of network attachment.

Tone allocation module 238 allocates sets of tones to wireless terminals. Tone allocation module 238 allocates a first set of tones for communication with a first wireless terminal in a sector pair state, the first set of tones being allocated to the first wireless terminal in each of a first and second sector of a sector pair. The tone allocation module 238 further allocates the first set of tones to a second wireless terminal in said first sector during at least a portion of time in which said first set of tones are allocated to the first wireless terminal. The second wireless terminal is in one of a sector state and a sector pair state.

Tone hopping module 240 hops sets of tones in a time synchronized manner in the sectors of the cell. For example, tone hopping module 240 hops a first set of tones over time in a time synchronized manner in a sector pair of the cell. In various embodiments, different hopping schemes are utilized for uplink and for downlink signals. In some embodiments, the downlink is hopped at a faster rate than the uplink is hopped. Tone hopping may, and sometimes does, represents hopping of indexed tones in a logical channel structure to indexed physical tones used for transmission purposes.

Combiner module 242 combines a signal received on a first antenna face with a signal received on a second antenna face. Extraction module 244 extracts a signal corresponding to one of a first and second wireless terminal from a combined signal from combiner module 242, to recover at least some information transmitted by at least one of said first and second wireless terminals. Cancellation module 246 cancels the extracted signal from the signal received on one of the antenna faces to generate a processed signal. Information recovery module 248 recovers information communicated by the second wireless terminal from the processed signal.

State determination module 250 determines if a wireless terminal is in a sector state or sector pair state based on received path loss information, e.g., a channel condition feedback report corresponding to two adjacent sectors. Symbol time synchronization module 252 maintains symbol timing synchronization between the different sectors of the cell, e.g., OFDM symbol timing synchronization.

Data information 234 includes wireless terminal data/information 254 and timing frequency structure information 260. Wireless terminal data/information 254 includes information corresponding to a plurality of wireless terminals using the base station as point of network attachment (WT 1 data information 256, . . . , WT N data/information 258). WT 1 data/information 256 includes state information 262 sector or sector pair identification information 264, allocated tone set information 266, path loss information corresponding to a $1^{st}$ antenna face 272, and path loss information corresponding to a $2^{nd}$ antenna face 274. Data/information 256 also includes one or more of recovered information being communicated 268 and information to transmit 270. State information 262 includes information indicating whether wireless terminal 1 is in a sector state or sector pair state. State information 262 represents an output of state determination module 250. Sector or sector pair identification information 264 includes information identifying, for a wireless terminal in a sector state the sector, the transmit antenna face, and the receive antenna face to which the sector state corresponds. Sector or sector pair identification information 264 includes information identifying, for a wireless terminal in a sector pair state, the pair of adjacent sectors, the pair of adjacent transmit antenna faces, and the pair of receive antenna faces to which the sector pair state corresponds. Sector or sector pair identification information 264 also includes information identifying which sectors and antenna faces received path loss information corresponds to. Allocated tone set information 266 includes information identifying a set of tones currently allocated to wireless terminal 1 by tone allocation module 240. The set of allocated tones can correspond to a downlink set of tones or an uplink set of tones. Path loss information corresponding to $1^{st}$ antenna face 272 is, e.g., feedback information received from WT 1 indicative of channel conditions between a $1^{st}$ antenna face and WT 1. Path loss information corresponding to $2^{nd}$ antenna face 274 is, e,g., feedback information received from WT 1 indicative of channel conditions between a $2^{nd}$ antenna face and WT 1, the second antenna face being adjacent said first antenna face. Path loss information (272, 274) is used by state determination module 250 in deciding the state for WT 1, e.g., sector state or sector pair state. In general, for a wireless terminal near a sector boundary, the wireless terminal is in a sector pair state, while for a wireless terminal far away from a sector boundary the wireless terminal is in a sector state.

Recovered information being communicated 268 includes information output from extraction module 244 and/or information output from information recovery module 248.

Timing/frequency structure information 260 includes downlink timing/frequency structure information and uplink timing frequency structure information. Downlink timing/frequency structure information includes information identifying and/or defining: downlink channel structure including logical channel segments, downlink frequency bands, downlink tone set information, subsets of tones which can be allocated to a wireless terminal, pilot signal information corresponding to each of the sectors, and downlink timing structure information including information defining symbol transmission timing intervals, groupings of symbols, e.g., into slots, superslots, beaconslots, ultraslots, etc., and recurring pattern information.

Uplink timing/frequency structure information includes information identifying and/or defining: uplink channel structure including logical channel segments, uplink frequency bands, uplink tone set information, subsets of tones which can be allocated to a wireless terminal, and uplink timing structure information including information defining symbol transmission timing intervals, groupings of symbols, e.g., into dwells and recurring pattern information.

Figure 3:
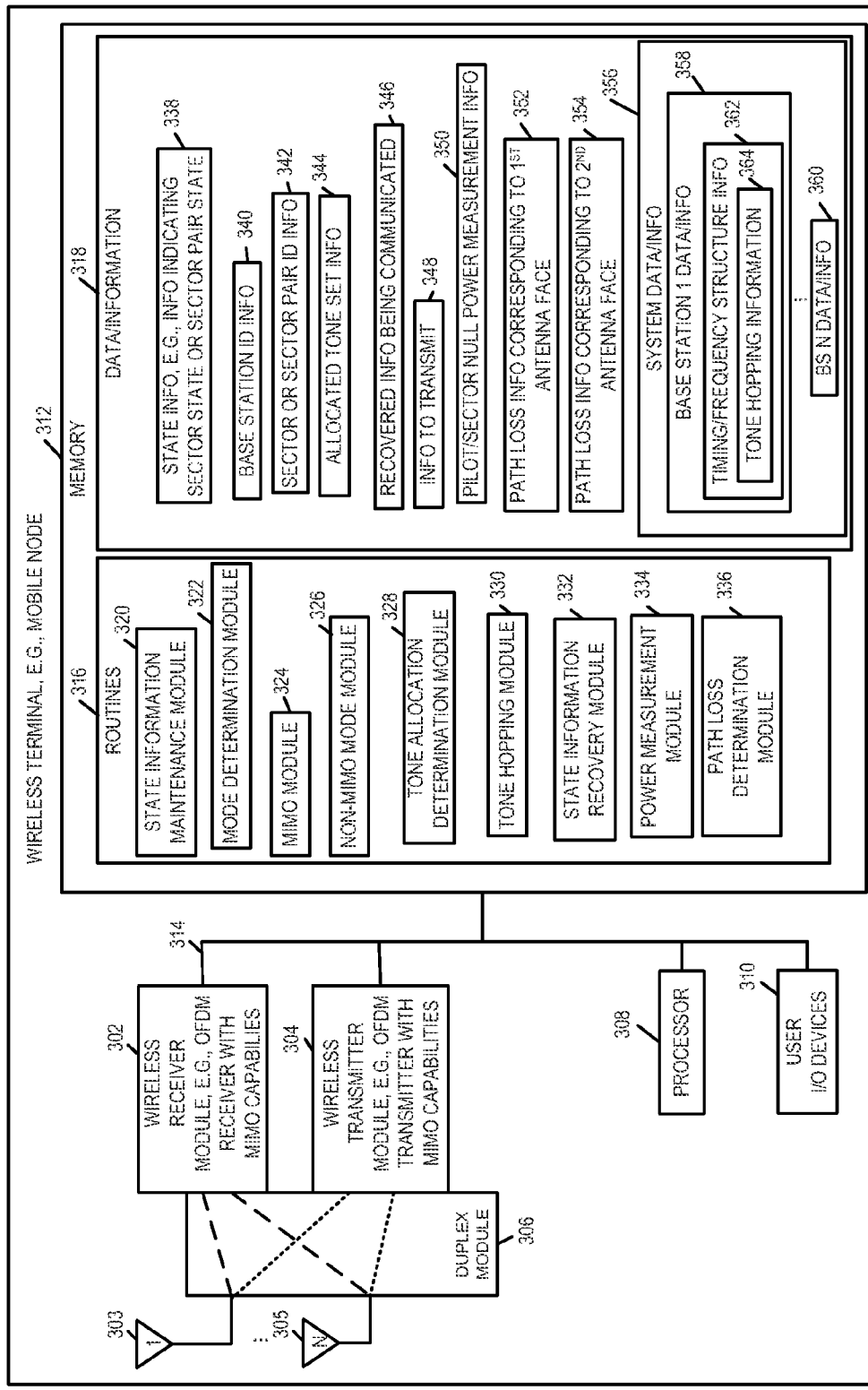
FIG. 3 is a drawing of an exemplary wireless terminal, e.g., mobile node, in accordance with various embodiments.

Timing/frequency structure information 260 also includes tone hopping information 276. In various embodiments, different tone hopping information is used for the downlink and the uplink, FIG. 3 is a drawing of an exemplary wireless terminal 300, e.g., mobile node, in accordance with various embodiments. Exemplary wireless terminal 300 is, e.g., one of the wireless terminals in system 100 of FIG. 1. Exemplary wireless terminal 300 is for use in a sectorized cell, each sector of said sectorized cell being adjacent at least one other sector in the cell, adjacent sectors forming sector pairs, the cell including a base station coupled to a multi-face antenna, each face of said base station antenna corresponding to a different sector of said cell, said sectors being timing synchronized. In some embodiments, the base station has three sectors.

Exemplary wireless terminal 300 includes a wireless receiver module 302, a wireless transmitter module 304, a processor 308, user I/O devices 310 and memory 312 coupled together via bus 314 over which the various elements interchange data and information. Memory 312 includes routines 316 and data/information 318. The processor 308, a CPU, executes the routines 316 and uses the data/information 318 in memory 312 to control the operation of the wireless terminal 300 and implement methods, e.g., the method of flowchart 500 of FIG. 5.

Wireless terminal 300 also includes a plurality of antennas (antenna 1 303, . . . , antenna N 305), and a duplex module 306. The duplex module 303 couples one or more of the antennas (antenna 1 303, . . . , antenna N 305) to wireless receiver module 302. The duplex module 303 also couples one or more of the antennas (antenna 1 303, . . . , antenna N 305) to wireless transmitter module 304. In some other embodiments, different antennas are used for transmission and reception.

Wireless receiver module. 302, e.g., an OFDM receiver with MIMO capabilities, is used for receiving downlink signals from a base station. Wireless transmitter module 304, e.g., an OFDM transmitter with MIMO capabilities, is used for transmitting uplink signals to abuse station. Information transmitted by transmitter module 304 includes path loss information corresponding to a first antenna face of an antenna face pair and path loss information corresponding to a second antenna face in the antenna face pair, wherein said first and second antenna faces are adjacent antenna faces. Information transmitted by transmitter module 304 also includes uplink user data, e.g., uplink traffic channel segment data.

User I/O devices 310, e.g., microphone, keypad, keyboard, mouse, camera, switches, speaker, display, etc., are used to receive input from the user of wireless terminal 300 and output information to the user of wireless terminal 300. In addition, user I/O devices 310 allow a user of wireless terminal 300 to control at least some functions of the wireless terminal, e.g., initiate a communications session.

Routines 316 includes a state information maintenance module 320, a triode determination module 322, a MIMO module 324, a non-MIMO mode module 326, a tone allocation determination module 328, a tone hopping module 330, a state information recovery module 332, a power measurement module 334, and a path loss determination module 336. State information maintenance module 320 maintains information indicating whether said wireless terminal is in a sector state or sector pair state. Mode determination module 322 determines whether the wireless terminal is to operate in a MIMO or non-MIMO mode of operation as a function of the maintained information indicating whether said wireless terminal is in a sector state or sector pair state.

MIMO module 324 is used for communicating with a base station when the wireless terminal 300 is in a MIMO mode of operation, as determined by module 322. Non-MIMO triode module 326 is used for communicating with a base station when the wireless terminal 300 is in a non-MIMO mode of operation, e.g., a SISO mode of operation, as determined by module 322. Modules 324 and 326 control various operations of wireless receiver module 302, wireless transmitter module 304, and duplex module 306 to implement a determined mode of operation. In various embodiments, communicating with a base station in a MIMO mode of operation includes using at least two wireless terminal antennas from the set of antennas (303, . . . , 305) in communications with two adjacent base station antenna faces. In some such embodiments, communicating with the base station in a MIMO mode of operation farther includes using a first set of tones for communicating with both base station antenna faces of two adjacent base station antenna faces during the same time.

Tone allocation determination module 328 determines from received signal that a wireless terminal has been allocated a first set of tones for communicating. During some times, the tone allocation determination module 328 determines from received signals, e.g., received assignment signals, that the wireless terminal has been allocated a first set of tones for communication with both a first antenna face of the multi-face base station antenna and a second antenna face of the multi-face base station antenna, said first and second faces being adjacent.

Tone hopping module 330 uses stored information, e.g., stored tone hopping information 364 corresponding to base station 1 to implement tone hopping, wherein the first set of tones allocated to wireless terminal 300 are hopped over time in a synchronized manner in a sector pair.

State information recovery module 332 recovers from a received signal a base station determination indicating whether said wireless terminal is to be in a sector state or sector pair state, wherein said base station determination is based upon received path loss information communicated from the wireless terminal to the base station.

Power measurement module 334 performs a power measurement of a signal received on a tone during a period of time during which a first base station antenna face transmits a pilot tone signal and a second base station antenna face intentionally does not transmit on that tone, said first and second base station antenna faces being adjacent. This use of pilot signals from one base station antenna face intentionally paired with an intentional null from an adjacent base station antenna face, facilitates wireless terminal determination of path loss information with respect to individual base station antenna faces. Path loss determination module 336 determines path loss information as a function of power measurement information from module 334.

Data/information 318 includes state information 338, base station identification information 340, sector or sector pair identification information 342, allocated tone set information 344, recovered information being communicated 346, information to transmit 348, pilot/sector null measurement information 350, path loss information corresponding to a $1^{st}$ antenna face 352, path loss information corresponding to a $2^{nd}$ antenna face 354, and system data/information 356. State information 338 includes information indicating whether the wireless terminal 300 is currently in a sector state or in a sector pair state. Base station identification information 340 includes information identifying which base station, from the plurality of base stations in the communications system, the wireless terminal is currently using as its point of network attachment. Sector or sector pair identification information 342 includes information identifying the particular sector of the base station for which tones are allocated to the wireless terminal when in the sector state and information identifying the pair of adjacent sectors of the base station for which tones are allocated to the wireless terminal for concurrent use when in the sector pair state. Information 342 also includes information identifying the sectors used to which the path loss information being communicated corresponds. Recovered information being communicated 316 includes user data recovered using a MIMO decoding operation of the receiver module 302 when the wireless terminal is in a sector pair state. Recovered information being communicated 346 also includes user data recovered using a SISO decoding operation of the receiver module 302 when the wireless terminal is in a sector state. Information to be transmitted 348 includes user data to be transmitted which is subjected to MIMO encoding operations by wireless transmitter module 304, when the wireless terminal is in a sector pair state information to be transmitted 348 also includes user data to be transmitted which is subjected to SISO encoding operations by wireless transmitter module 304, when the wireless terminal is in a sector state, Pilot/sector null measurement information 350 represents output of power measurement module 334 and an input to path loss determination module 336. Path loss information corresponding to $1^{st}$ base station antenna face 352 and path loss information corresponding to $2^{nd}$ base station antenna face 354 represents outputs of path loss determination module 336. In some embodiments, the path loss information 352 is communicated independently from the path loss information 354; while in other embodiments, the information (352, 354) is transmitted in a jointly coded single report. In some embodiments, the report is a sector boundary report, e.g., as part of an uplink dedicated control channel reporting structure, System data information 356 includes a plurality of sets of base station information (base station 1 data/information 358, . . . , base station N data/information 360). Base station 1 data/information 358 includes base station identification information, base station sector identification information and timing/frequency structure information 362. Timing frequency structure information 362 includes, e.g., downlink carrier frequency information, uplink carrier frequency information, downlink frequency band information, uplink frequency band information, downlink tone block information, uplink tone block information, individual tone definition information, recurring downlink timing information, recurring uplink timing information, OFDM symbol transmission timing: information, information identifying grouping of OFDM symbols into, e.g., slots or dwells, downlink channel structure information and uplink channel structure information. Timing/frequency structure information 362 also includes tone hopping information 364. Tone hopping information 364, in some embodiments, includes different tone hopping information corresponding to the uplink and downlink. For example, the tone hopping, can be and sometimes is, different in both the hopping equations used and the rate of the hopping, tone hopping between successive OFDM transmission time intervals for the downlink and tone hopping based on dwells of seven successive OFDM symbol transmission time intervals for the uplink.

Figures 4, 4A, 4B, 4C:
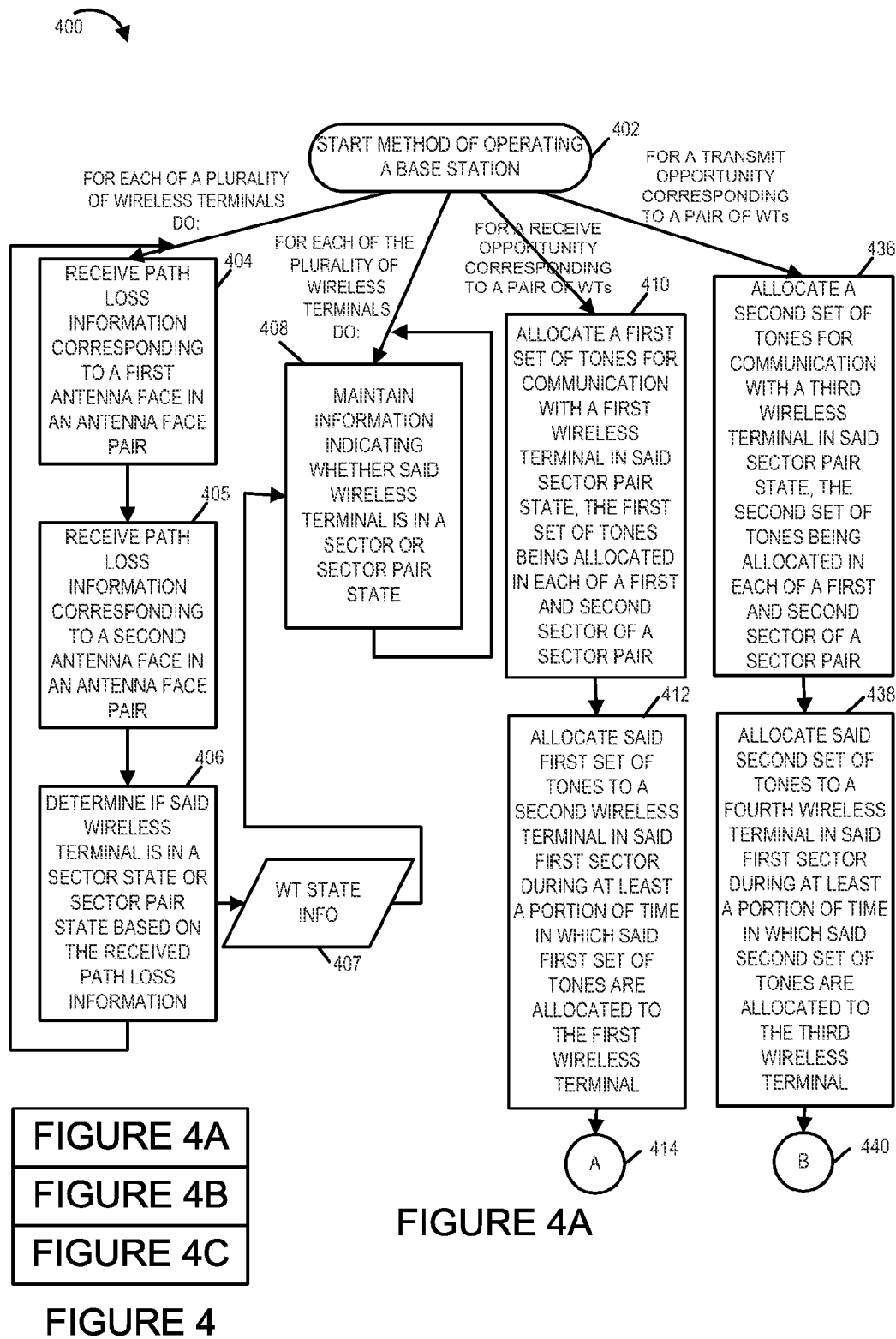
FIG. 4 comprising the combination of FIG. 4A, FIG. 4B
FIG. 4C is a flowchart of an exemplary method of operating a base station in accordance with various embodiments.
Figure 4B:
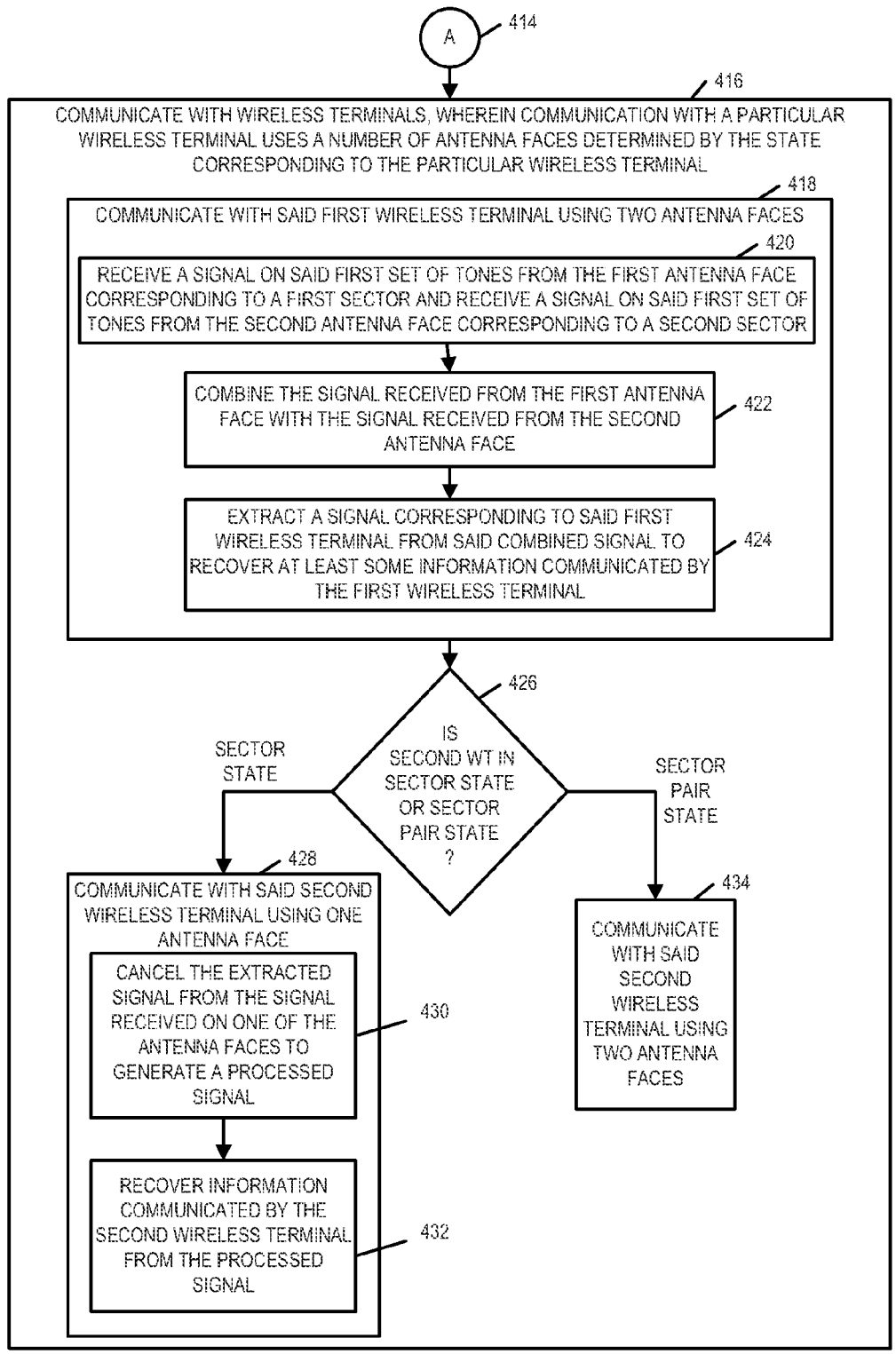
Figure 4C:
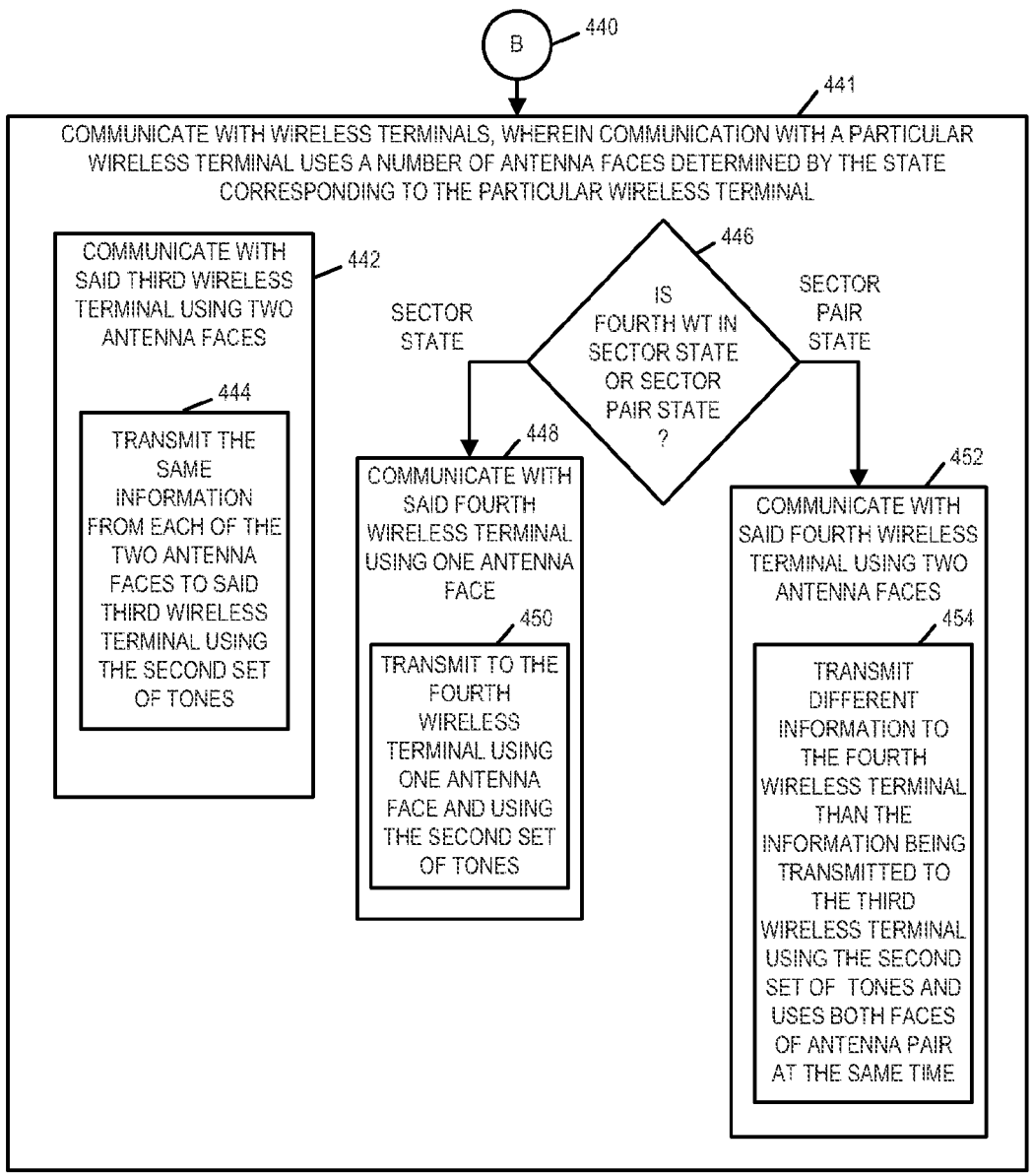

FIG. 4 comprising the combination of FIG. 4A, FIG. 4B and FIG. 4C is a flowchart 400 of an exemplary method of operating a base station in accordance with various embodiments. The base station is, e.g., a base station in a sectorized cell, each sector being adjacent at least one other sector in the cell, adjacent sectoring forming sector pairs, said base station being coupled to a multi-face antenna, each face of said antenna corresponding to a different sector or said cell, said sectors being timing synchronized. In some embodiments, the base station has three sectors. The base station is, e.g., base station 200 of FIG. 2. In some other embodiments, the base station has six sectors. Multi-sector base stations with different numbers of sectors are also possible. In various embodiments, said base station is a base station in an OFDM communications system and said timing synchronization is OFDM symbol time synchronization.

Operation of the exemplary method starts in step 402, where the base station is powered on and initialized and proceeds to steps 404, 408, 410, and 436. Operation proceeds to step 404, for each of a plurality of wireless terminals. In step 404, the base station receives path loss information corresponding to a first antenna face in an antenna face pair, and in step 405, the base station receives path loss information corresponding to a second antenna face in an antenna face pair. In various embodiments, the received path loss information is a power measurement of a signal transmitted on a tone during a time during which the adjacent antenna face does not transmit on said tone. For example, in some OFDM embodiments, there are at least some sector null and some corresponding pilot signals using the same tone at the same time in adjacent sectors. Operation proceeds from step 405 to step 406, in which the base station determines if said wireless terminal is in a sector state or sector pair state based on the received path loss information. Wireless terminal state information 407, identifying one of a sector state or sector pair state, is output from step 406 and input to step 408. Operation proceeds from step 406 to step 404, where the base station receives additional path loss information corresponding to the same wireless terminal.

In step 408, which is performed for each of a plurality of wireless terminals, on an ongoing basis, the base station maintains information indicating whether the wireless terminal is in a sector state or sector pair state.

Operation proceeds from start step 402 to step 410 for a receive opportunity corresponding to a pair of wireless terminals. In step 410, the base station allocates a first set of tones for communication with a first wireless terminal in said sector pair state, the first set of tones being allocated in each of a first and second sector of sector pair state. In some embodiments, the tones of the first set of tones are hopped in a synchronized manner in the sector pair. Operation proceeds from step 410 to step 412. In step 412, the base station allocates said first set of tones to a second wireless terminal in said first sector during at least a portion of time in which said first set of tones are allocated to the first wireless terminal. In some embodiments, the base station allocates said first set of tones to a second wireless terminal in said first sector during the same time in which said first set of tones are allocated to the first wireless terminal Operation proceeds from step 412 via connecting node A 414 to step 416.

In step 416 the base station communicates with wireless terminals, wherein communication with a particular wireless terminal uses a number of antenna faces determined by the state corresponding to the particular wireless terminal. In some such embodiments, the number is one or two. Step 416 includes sub-steps 418, 426, 428 and 434. In sub-step 418, the base station communicates with said first wireless terminal using two antenna faces. Sub-step 418 includes sub-steps 420, 422 and 424. In sub-step 420, the base station receives a signal on said first set of tones from a first antenna face corresponding to a first sector and concurrently receives a signal on said first set of tones from a second antenna face corresponding to a second sector. Then, in sub-step 422, the base station combines the signal received from the first antenna face with the signal received from the second antenna face. Operation proceeds from sub-step 422 to sub-step 424. In sub-step 424, the base station extracts a signal corresponding to said first wireless terminal from said combined signal to recover at least some information communicated by the first wireless terminal. Operation proceeds from sub-step 418 to sub-step 426.

In sub-step 426 the base station determines whether the second wireless terminal is in the sector state or sector pair state. If the second wireless terminal is in the sector state, then operation proceeds from sub-step 426 to sub-step 428; however, if the second wireless terminal is in the sector pair state, then operation proceeds from sub-step 426 to sub-step 434. In sub-step 428 the base station communicates with said second wireless terminal using one antenna face. Sub-step 428 includes sub-step 430 and sub-step 432. In sub-step 430, the base station cancels the extracted signal, obtained in sub-step 424, from the signal received on one of the antenna faces to generate a processed signal. Operation proceeds from sub-step 430 to sub-step 432. In sub-step 432, the base station recovers information communicated by the second wireless terminal from the processed signal. Returning to sub-step 434, in sub-step 434, the base station communicates with said second wireless terminal using two antenna faces.

Operation proceeds from start step 402 to step 436 for a transmit opportunity corresponding to a pair of wireless terminals. In step 436, the base station allocates a second set of tones for communication with a third wireless terminal in said sector pair state, the second set of tones being allocated in each of a first and second sector of sector pair state. In some embodiments, the second set of tones are hopped over time in a synchronized manner in the sector pair. Operation proceeds from step 436 to step 438. In step 438, the base station allocates said second set of tones to a fourth wireless terminal in said first sector during at least a portion of time in which said second set of tones are allocated to the third wireless terminals. In sonic embodiments, the base station allocates said second set of tones to a fourth wireless terminal in said first sector during the same time in which said second set of tones are allocated to the third wireless terminals. Operation proceeds from step 438 via connecting node B 440 to step 441.

In step 441 the base station communicates with wireless terminals, wherein communication with a particular wireless terminal uses a number of antenna faces determined by the state corresponding to the particular wireless terminal. Step 441 includes sub-steps 442, 446, 448 and 452. In sub-step 442, the base station communicates with said third wireless terminal using two antenna fixes. Sub-step 442 includes sub-step 444. In sub-step 444, the base station transmits the same information from each of two antenna faces to said third wireless terminal using the second set of tones.

In sub-step 446 the base station determines whether the fourth wireless terminal is in the sector state or sector pair state. If the fourth wireless terminal is in the sector state, then operation proceeds from sub-step 446 to sub-step 448; however, if the fourth wireless terminal is in the sector pair state, then operation proceeds from sub-step 446 to sub-step 452. In sub-step 448 the base station communicates with said fourth wireless terminal using one antenna face. Sub-step 448 includes sub-step 450. In sub-step 450, the base station transmits to the fourth wireless terminal using one antenna face and using the second set of tones. Returning to sub-step 452, in sub-step 452, the base station communicates with said fourth wireless terminal using two antenna faces. Sub-step 452 includes sub-step 454. In sub-step 454, the base station transmits different information to the fourth wireless terminal than the information being transmitted to the third wireless terminal using the second set of tones and uses both faces of the antenna pair at the same time.

Figure 5A:
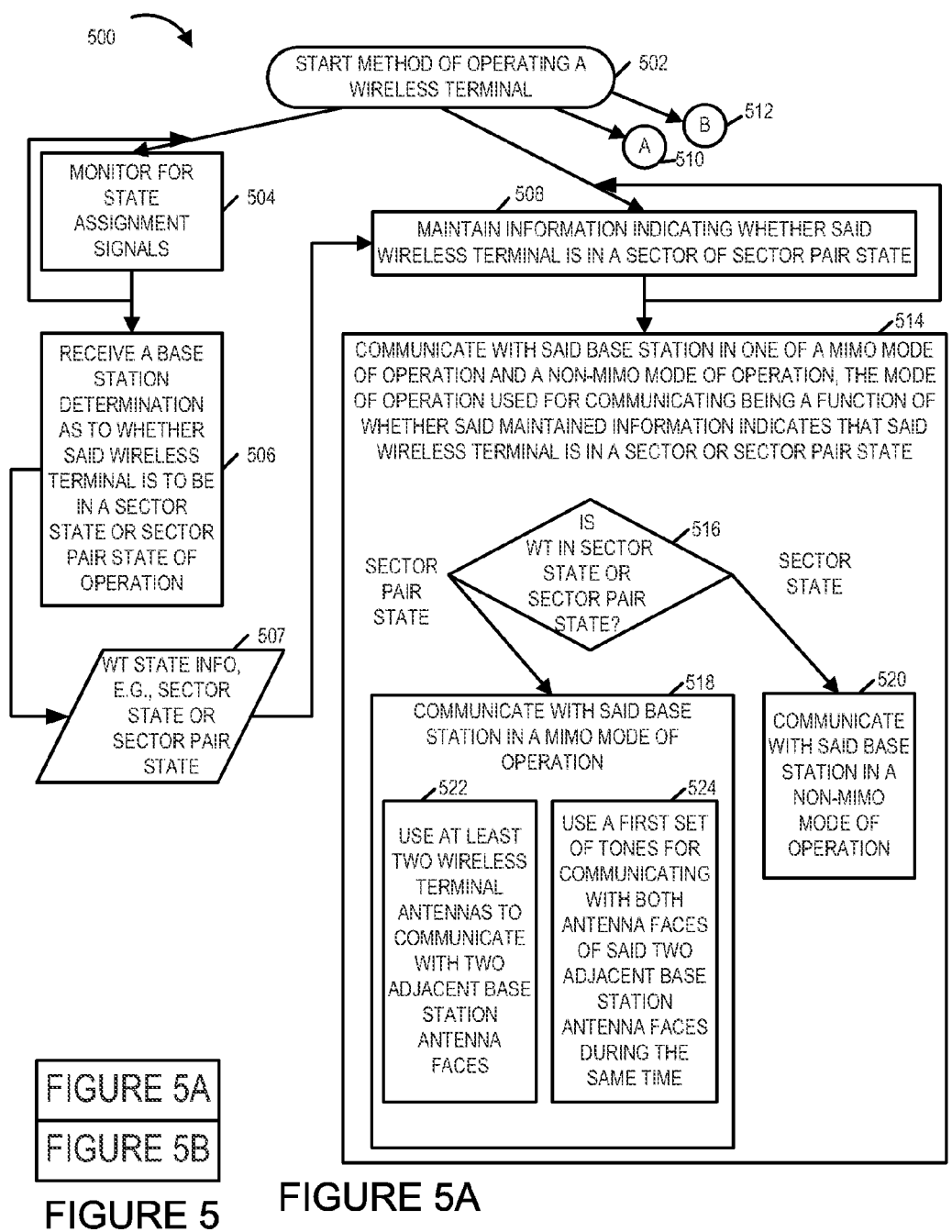
FIG. 5A is a first part of a flowchart of an exemplary method of operating a wireless terminal in accordance with various embodiments.
Figure 5B:
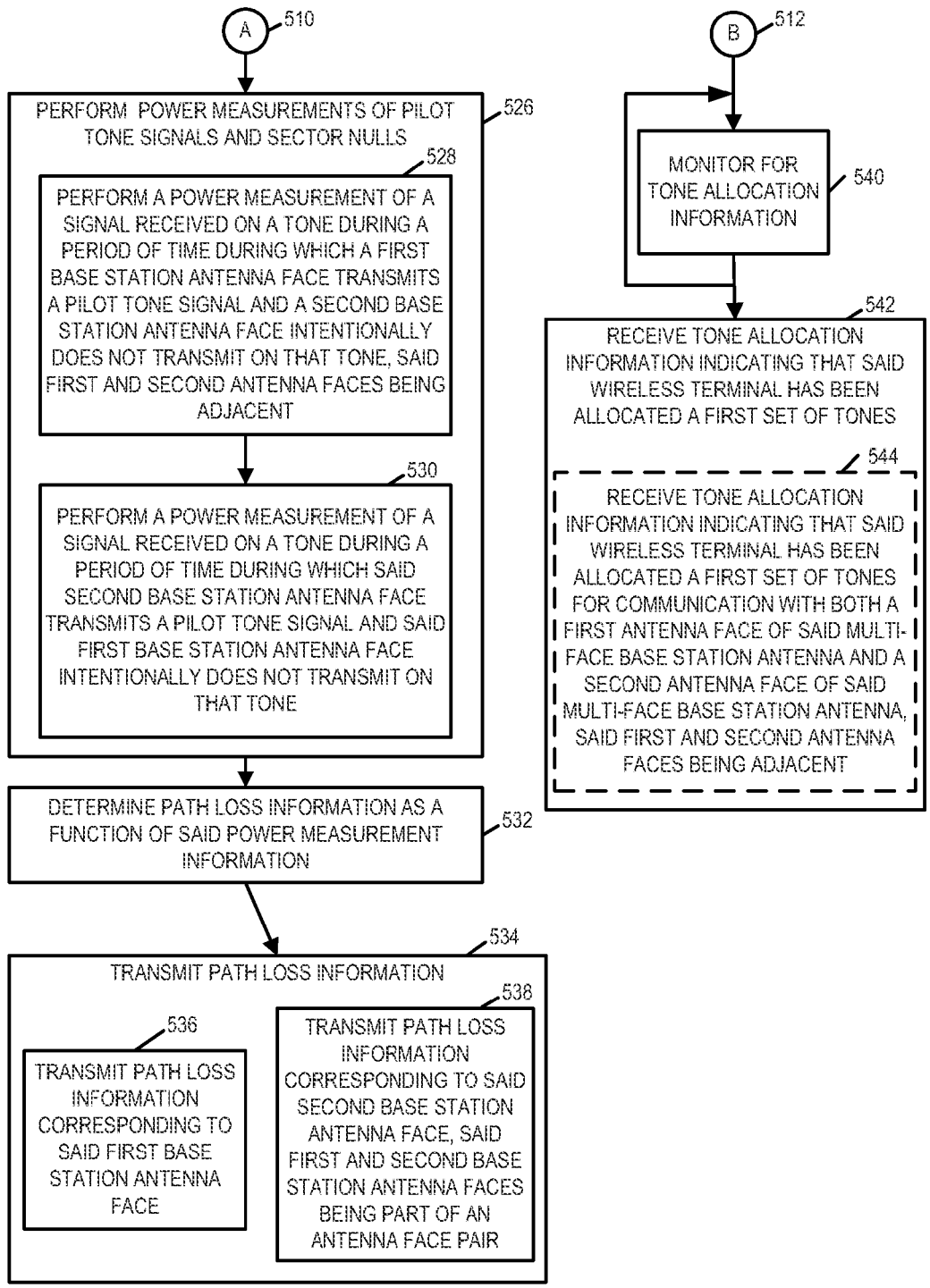
FIG. 5B is a second part of the flowchart of the exemplary method of operating a wireless terminal in accordance with various embodiments, with FIGS. 5A and 5B in combination being referred to as FIG. 5.

FIG. 5 comprising the combination of FIG. 5A and FIG. 5B is a flowchart 500 of an exemplary method of operating a wireless terminal in accordance with various embodiments. The exemplary wireless terminal is a wireless terminal in a sectorized cell, each sector being adjacent at least one other sector in the cell, adjacent sectors forming sector pairs, the cell including abase station, e.g., a three sector base station, coupled to a multi-face antenna, each face of said base station antenna corresponding to a different sector of the cell, said sectors being timing synchronized. The exemplary wireless terminal includes at least two antennas and supports MIMO signaling. In various embodiments, the wireless terminal is part of an OFDM wireless communications system and the sectors of a cell corresponding to a base station are OFDM symbol timing synchronized Operation starts in step 502, where the wireless terminal is powered on and initialized and proceeds to step 504. Operation proceeds from start step 502 to step 504, step 508, step 526 via connecting node A 510, and step 540 via connecting node B 512, In step 526, the wireless terminal performs power measurements of pilot tone signals and sector null signals. Step 526 includes sub-steps 528 and 530, in sub-step 528, the wireless terminal performs a power measurement of a signal received on a tone during a period of time during which a first base station antenna face transmits a pilot tone signal and a second base station antenna face intentionally does not transmit on that tone, said first and second antenna faces being adjacent. In sub-step 530, the wireless terminal performs a power measurement of a signal received on a tone during a period of time during which said second base station antenna face transmits a pilot tone signal and said first base station antenna face intentionally does not transmit on that tone. Operation proceeds from step 526 to step 532, in which the base station determines path loss information as a function of said power measurement information. Operation proceeds from step 532 to step 534. In step 534, the base station transmits path loss information. Step 534 includes sub-step 536 and sub-step 538. In sub-step 536, the base station transmits path loss information corresponding to said first base station antenna face and in step 538, the base station transmits path loss information corresponding to said second base station antenna face, said first and second base station antenna faces being part of antenna pair face. In some embodiments, path loss information corresponding to the first antenna face is transmitted independently of the path loss information corresponding to the second antenna face. In some embodiments, path loss information corresponding to the first antenna face is communicated in the same report as path loss information corresponding to the second antenna face.

Returning to step 504, in step 504, which is performed on an ongoing basis, the wireless terminal monitors for state assignment signals. Operation proceeds from step 504 to step 506 for a received state assignment signal intended for the wireless terminal In step 506, the wireless terminal receives a base station determination as to whether said wireless terminal is to be in a sector state or sector pair state. The base station determination is based upon received path loss information from the wireless terminal WT state information 507, e.g., an indication of either sector state or sector pair state, is an output from step 506 which is used an input in step 508.

In step 508, which is performed on an ongoing basis, the wireless terminal maintains information indicating whether said wireless terminal is in a sector state or sector pair state. Operation proceeds from step 508 to step 514. In step 514, the wireless terminal communicates with said base station in one of a MIMO mode of operation and a non-MIMO mode of operation, the mode of operation used for communication being a function of whether said maintained information indicates that said wireless terminal is in a sector state or sector pair state. Step 514 includes sub-steps 516, 518 and 520.

In sub-step 516, the wireless terminal checks if the wireless terminal is in a sector state or sector pair state. 1f the wireless terminal is determined to be in a sector pair state operation proceeds from sub-step 516 to sub-step 518; otherwise operation proceeds from sub-step 516 to sub-step 520. In sub-step 518, the wireless terminal communicates with said base station in a MEMO mode of operation. Sub-step 518 includes sub-steps 522 and 524. In sub-step 522, the wireless terminal uses at least two wireless terminal antennas to communicate with two adjacent base station antenna faces. In sub-step 524, the wireless terminal uses a first set of tones to communicate with both faces of said two adjacent base station antenna faces during the same time. Returning to step 520, in step 520, the wireless terminal communicates with the base station in a non-MIMO mode of operation, e.g., a SISO mode of operation or a mode of operation or a mode of operation using two or more wireless terminal antennas communicating with a single base station antenna face.

Returning to step 540, in step 540, which is performed on an ongoing basis, the wireless terminal monitors for tone allocation information. Operation proceeds from step 540 to step 542 in response to detected tone allocation information intended for the wireless terminal. In step 542, the wireless terminal receives tone allocation information indicating that said wireless terminal has been allocated a first set of tones. Step 542 includes sub-step 544 for some tone allocations, e.g., a tone allocation when said wireless terminal is in a sector pair state. In sub-step 544, the wireless terminal receives tone allocation information indicating that said wireless terminal has been allocated a first set of tones for communication with both a first antenna face of said multi-face base station antenna and second antenna face of said multi-face base station antenna, said first and second antenna faces being adjacent. In various embodiments, the first set of tones are hopped in a time synchronized, manner in the sector pair.

FIG. 6 is a drawing 600 illustrating an exemplary embodiment corresponding system 100 of FIG. 1 in which WT 4 130 includes two antennas (antenna 1 602, antenna 2 604). Communications 144 between base station sector B antenna face 120 and WT 4 130 includes a first portion 144a corresponding to antenna 1 602 and a second portion 144b corresponding to antenna 2 604. Similarly, communications 146 between base station sector C antenna face 122 and WT 4 130 includes a first portion 146a corresponding to antenna 1 602 and a second portion 146b corresponding to antenna 2 604.

FIG. 7 is a drawing 700 illustrating an exemplary embodiment corresponding system 100 of FIG. 1 in which WT 4 130 includes three antennas (antenna 1 702, antenna 2 704, antenna 3 706). Communications 144 between base station sector B antenna face 120 and WT 4 130 includes a first portion 144c corresponding to antenna 1 702, a second portion 144d, corresponding to antenna 2 704, and a third portion 144e corresponding to antenna 3 706. Similarly, communications 146 between base station sector C antenna face 122 and WT 4 130 includes a first portion 146c corresponding antenna 1 702, a second portion 146d corresponding to antenna 2 704, and a third portion 146e corresponding to antenna 3 706. Embodiments, with wireless terminals having more than three antennas are also possible.

Figure 8:
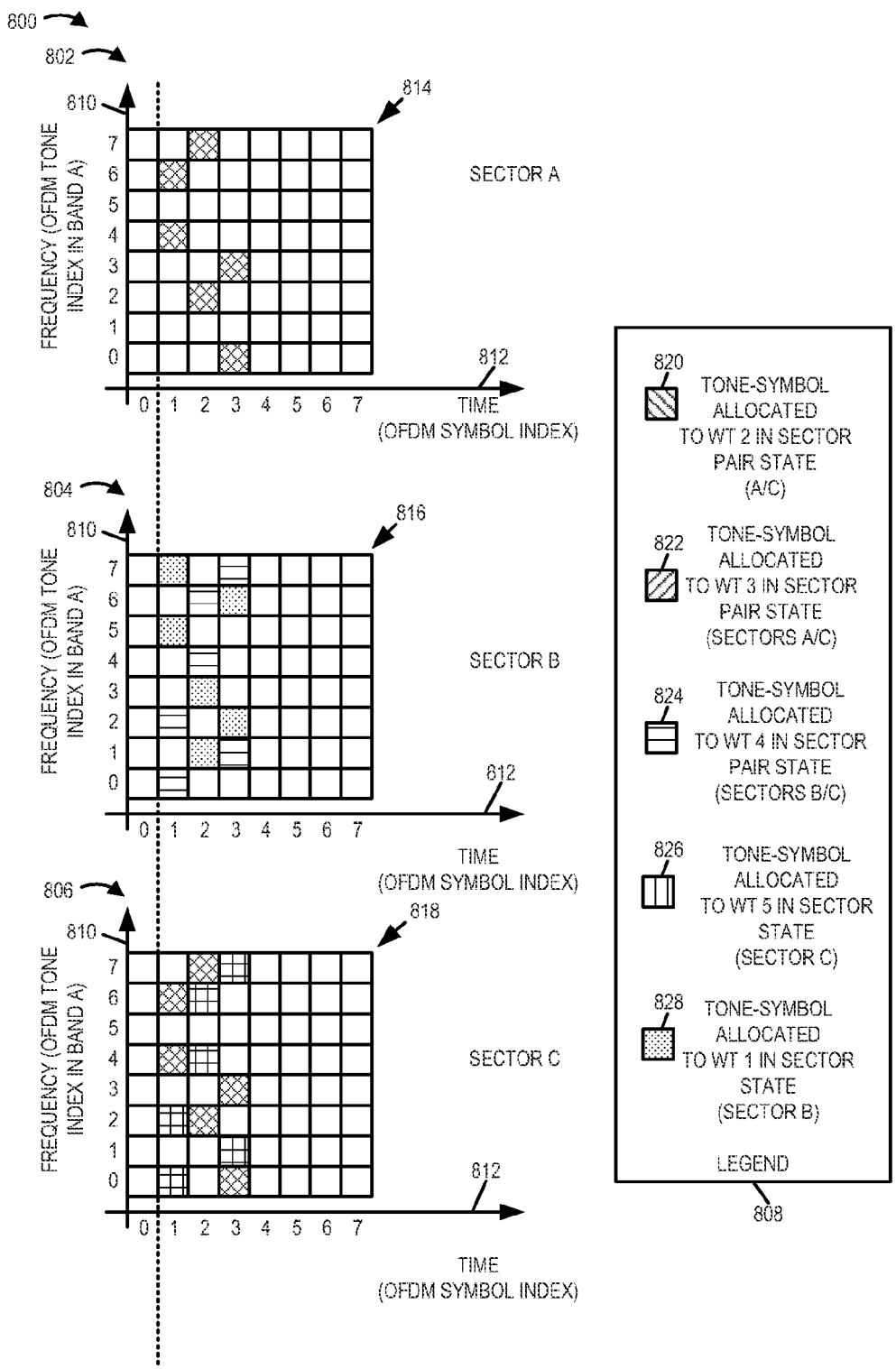
FIG. 8 is a drawing illustrating exemplary air link resources corresponding to different sectors of a base station and exemplary tone allocation to wireless terminals in accordance with various embodiments.

FIG. 8 is a drawing 800 illustrating exemplary air link resources corresponding to different sectors of a base station and exemplary tone allocation to wireless terminals in accordance with various embodiments. Drawing 800 includes a first graph 802 corresponding to sector A, a second graph 804 corresponding to sector B, and a third graph 806 corresponding to sector C. Each graph (802, 804, 806) includes a vertical axis 810 representing frequency, e.g., OFDM tone index in frequency band A, and a horizontal axis 812 of time, e.g., OFDM symbol index. It should be noted that the three sectors of the base station are synchronized in terms of both time and frequency. In this exemplary embodiment, tone hopping, e.g., in terms of logical channel tone index designation to physical tone index designation, is also synchronized with respect to the sectors.

Block 814 in graph 802 represents 64 basic units of air link resources, e.g., 64 OFDM tone-symbols, used by sector A and illustrates exemplary allocation of those resources. Block 816 in graph 804 represents 64 basic units of air link resources, e.g., 64 OFDM tone-symbols, used by sector B and illustrates exemplary allocation of those resources. Block 818 in graph 806 represents 64 basic units of air link resources, e.g., 64 OFDM tone-symbols, used by sector A and illustrates exemplary allocation of those resources.

Legend 808 indicates that a tone-symbol allocated to WT 2, which is in sector pair state with the sectors of the pair being A and C, is indicated by diagonal line shading with descending slope from left to right as shown in example small block 820. Legend 808 indicates that a tone-symbol allocated to WT 3, which is in sector pair state with the sectors of the pair being A and C, is indicated by diagonal line shading with ascending slope from left to right as shown in example small block 822. Legend 808 indicates that a tone-symbol allocated to WT 4, which is in sector pair state with the sectors of the pair being B and C, is indicated by horizontal line shading as shown in example small block 824. Legend 808 indicates that a tone-symbol allocated to WT 5, which is in sector state with the sector being C, is indicated by vertical line shading as shown in example small block 826. Legend 808 indicates that a tone-symbol allocated to WT 1, which is in sector state with the sector being B, is indicated by dotted shading as shown in example small block 828.

Figure 9:
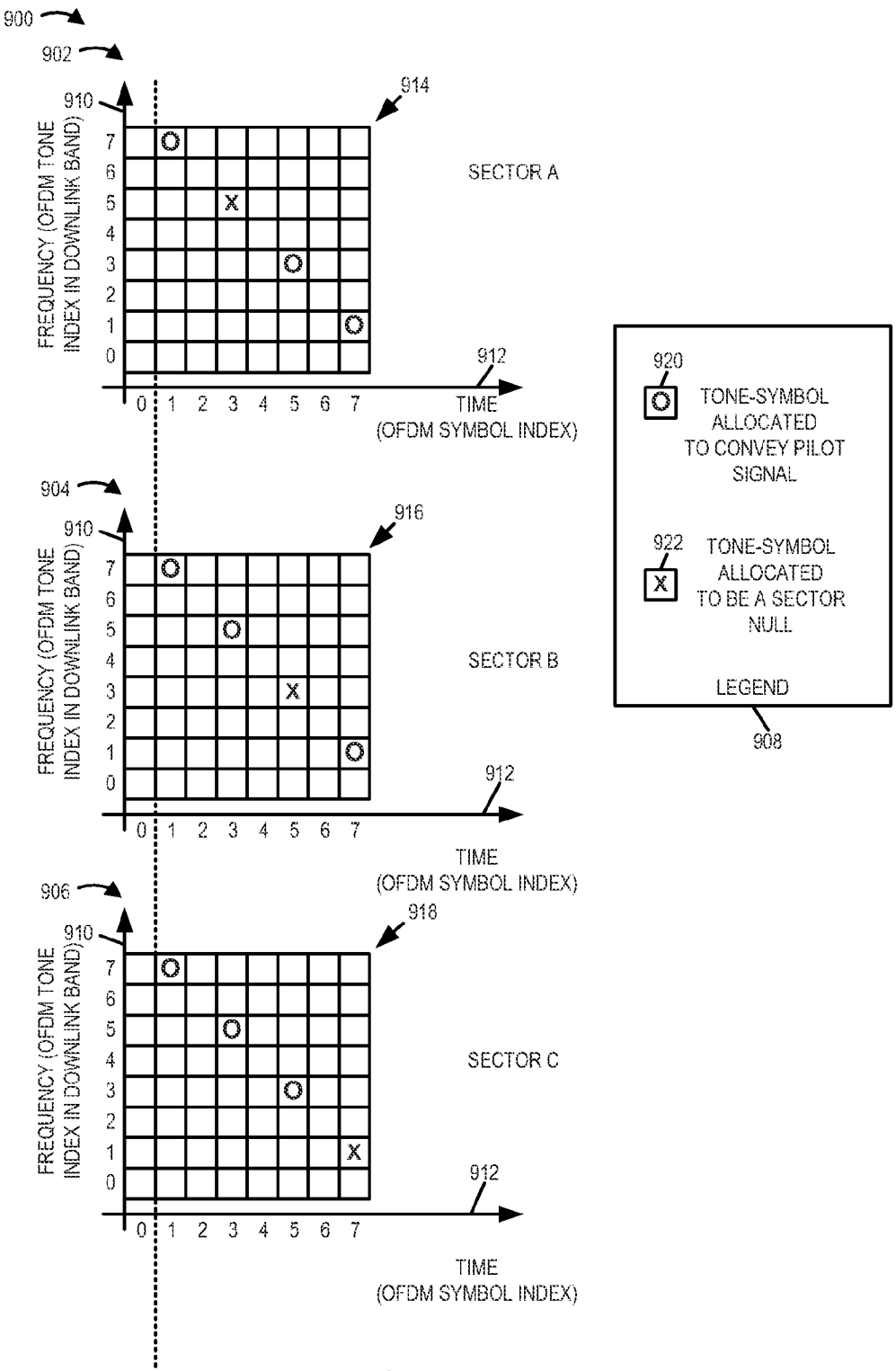
FIG. 9 is a drawing illustrating sector nulls corresponding to pilot tones in an exemplary OFDM wireless communications system implementing synchronized sectors.

FIG. 9 is a drawing 900 illustrating sector nulls corresponding to pilot tones in an exemplary OFDM wireless communications system implementing synchronized sectors. Drawing 800 includes a first graph 902 corresponding to sector A, a second graph 904 corresponding to sector B, and a third graph 906 corresponding to sector C. Each graph (902, 904, 906) includes a vertical axis 910 representing frequency, e.g., OFDM tone index in downlink frequency band, and a horizontal axis 912 of time, e.g., OFDM symbol index. It should be noted that the three sectors of the base station are synchronized in terms of both time and frequency.

Block 914 in graph 902 represents 64 basic units of air link resources, e.g., 64 OFDM tone-symbols, used by sector A and illustrates exemplary allocation of those resources with regard to pilot tone signals and intentional nulls. Block 916 in graph 904 represents 64 basic units of air link resources, e.g., 64 OFDM tone-symbols, used by sector B and illustrates exemplary allocation of those resources with regard to pilot tone signals and intentional nulls. Block 918 in graph 906 represents 64 basic units of air link resources, e.g., 64 OFDM tone-symbols, used by sector C and illustrates exemplary allocation of those resources with regard to pilot tone signals and intentional nulls.

Legend 908 indicates that a tone-symbol allocated to convey a pilot tone signal is represented by a small box including an O, as shown in example element 920; while a tone-symbol allocated to convey an intentional sector null is represented by a small box including an X, as shown in example element 922.

In various embodiments one or more channel quality measurements and/or indicators are used by state determination module 250 in deciding the state for a wireless terminal WT, e,g., sector state or sector pair state. In the above description, the channel quality indicator used by the state determination module 250 has been described as path loss information. However, other types of channel quality information may, and in some embodiments are, used in the place of path loss information. Consider for example SNR measurements which are used in the place of path loss information by the state determination module 250 in making the state determination in some embodiments. Such an embodiment is particularly well suited when an uplink transmission SNR value is available for use. In such a case, the SNR value is dependent on path loss but may also be dependent on other factors such as sector interference. The SNR may, and in some embodiments is, measured separately from sector interference measurements. Sector interference is an example of a channel quality measurement upon which the state determination may be made instead of path loss however, as can be appreciated, other channel quality indicates may be used instead or in addition to SNR and/or path loss information.

It should also be appreciated that while determining path loss has been described in the above example as being done, at least in some embodiments by measuring path loss through the use of sector pilots and/or sector nulls other approaches may be used for determining path loss. For example, in some embodiments rather than have the mobile determine and communicate path loss information to the base station, the base station may determine path loss by monitoring one or more persistent, periodic or otherwise recurring uplink signals from the mobile transmitted at, a power level known to the base station. In one particular embodiment, the base station monitors a dedicated uplink control channel between the mobile and the base station and estimates path loss based on measurements of signals received from the mobile node which correspond to the dedicated uplink control channel. Other base station centric ways of measuring and/or estimating path loss could be used depending on the particular embodiment and the above examples are intended to facilitate an understanding of various embodiments but not limit the scope of subject matter thereto.

While described, in the context of an OFDM system, the methods and apparatus of various embodiments are applicable to a wide range of communications systems including many non-OFDM and/or non-cellular systems.

In various embodiments nodes described herein are implemented using one or more modules to perform the steps corresponding to one or more methods, for example, maintaining information indicating a sector state or sector pair state, communicating with a wireless terminal using a number of base station antenna faces determined by the state corresponding to the wireless terminal, determining a state for a wireless terminal as a function of received path loss information, maintaining timing synchronization between sectors, transmitting pilots in conjunction with sector nulls, etc. some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e,g., in one or more Bodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a base station in a sectorized cell, said base station being coupled to a multi-face antenna, the method comprising:
   for each of a plurality of wireless terminals in said cell, maintaining in memory information indicating whether said wireless terminal is in a sector or sector pair state; and
   communicating with one of said wireless terminals using a number of antenna faces determined by the state corresponding to said wireless terminal, said communicating including:
      combining a signal received on a first set of tones by a first antenna face with a signal received on said first set of tones by a second antenna face to produce a combined signal; and
      extracting a signal corresponding to one of a first and second wireless terminals from said combined signal to recover at least some information transmitted by at least one of said first and second wireless terminals.

2. The method of claim 1, wherein said number is one or two.

3. The method of claim 2, wherein said base station has 3 sectors.

4. The method of claim 2, wherein said base station is a base station in an OFDM system and said timing synchronization is OFDM symbol time synchronization.

5. The method of claim 1, further comprising;
   allocating said first set of tones for communication with the first wireless terminal in said sector pair state, the first set of tones being allocated in each of a first and second sector of said sector pair.

6. The method of claim 5, further comprising allocating said first set of tones to the second wireless terminal in said first sector during at least a portion of time in which said first set of tones are allocated to the first wireless terminal.

7. The method of claim 6, wherein said second wireless terminal is in one of a sector state and a sector pair state.

8. The method of claim 6, further comprising:
   determining that said one of said wireless terminals is in a sector pair state, prior to extracting the signal corresponding to one of a first and second wireless terminals.

9. The method of claim 8, further comprising:
   canceling the extracted signal from the signal received on one of said antenna faces to generate a processed signal; and
   recovering information communicated by the second wireless terminal from said processed signal.

10. The method of claim 5, wherein said first set of tones are hopped over time in a synchronized manner in the sector pair.

11. The method of claim 1, wherein communicating with one of said wireless terminals includes transmitting the same information from each the antenna faces of a sector pair to the first wireless terminal.

12. The method of claim 11, wherein communicating includes transmitting different information to first and second wireless terminals using the same set of tones and using both antenna faces of an antenna pair at the same time, said first and second wireless terminals each being in a sector pair state.

13. The method of claim 1, further comprising:
   receiving path loss information corresponding to the first antenna face in an antenna face pair;
   receiving path loss information corresponding to the second antenna face in said antenna face pair; and
   determining if a wireless terminal is an a sector state or sector pair state based on the received path loss information.

14. The method of claim 13, wherein said received path loss information is a power measurement of a signal transmitted on a tone during a period of time during which the adjacent antenna face does not transmit on said tone.

15. A base station in a sectorized cell, said base station being coupled to a multi-face antenna, the base station comprising:
- a wireless terminal state information maintenance module for maintaining information indicating whether a wireless terminal is in a sector or sector pair state for each of a plurality of wireless terminals in said cell;
- a communications module for communicating with one of said wireless terminals using a number of antenna faces determined by the state corresponding to said wireless terminal;
- a combiner module for combining a signal received on a first set of tones by a first antenna face with a signal received on said first set of tones by a second antenna face to produce a combined signal; and
- an extraction module for extracting a signal corresponding to one of a first and second wireless terminals from said combined signal to recover at least some information transmitted by at least one of said first and second wireless terminals.

16. The base station of claim 15, wherein said number is one or two.

17. The base station of claim 15, further comprising:
- a tone allocation module for allocating said first set of tones for communication with the first wireless terminal in said sector pair state, the first set of tones being allocated in each of a first and second sector of said sector pair.

18. The base station of claim 17, wherein said tone allocation module further allocates said first set of tones to the second wireless terminal in said first sector during at least a portion of time in which said first set of tones are allocated to the first wireless terminal.

19. The base station of claim 18, wherein said communication module includes:
- a receiver module for receiving said signal on said first set of tones from the first antenna face corresponding to said first sector and for receiving said signal on said first set of tones from the second antenna face corresponding to said second sector; the base station further comprising:
- a cancellation module for canceling the extracted signal from the signal received on one of said antenna faces to generate a processed signal; and
- an information recovery module for recovering information communicated by the second wireless terminal from said processed signal.

20. A base station in a sectorized cell, said base station being coupled to a multi-face antenna, the base station comprising:
- means for maintaining for each of a plurality of wireless terminals, wireless terminal state information indicating whether a wireless terminal is in a sector or sector pair state for each of a plurality of wireless terminals in said cell; and
- means for communicating with one of said wireless terminals using a number of antenna faces determined by the state corresponding to said wireless terminal;
- means for combining a signal received on a first set of tones by a first antenna face with a signal received on said first set of tones by a second antenna face to produce a combined signal; and
- means for extracting a signal corresponding to one of a first and second wireless terminals from said combined signal to recover at least some information transmitted by at least one of said first and second wireless terminals.

21. The base station of claim 20, further comprising;
- means for allocating said first set of tones for communication with the first wireless terminal in said sector pair state, the first set of tones being allocated in each of a first and second sector of said sector pair; and
- means for hopping sets of tones, and
- wherein said means for hopping sets of tones hops said first set of tones over time in a synchronized manner in the sector pair.

22. A non-transitory computer readable medium embodying machine executable instructions for controlling a base station in a sectorized cell, said base station being coupled to a multi-face antenna, the non-transitory computer readable medium comprising:
- instruction for causing a processor to maintain, for each of a plurality of wireless terminals in said cell, information indicating whether said wireless terminal is in a sector or sector pair state;
- instruction for causing said processor to communicate with one of said wireless terminals using a number of antenna faces determined by the state corresponding to said wireless terminal;
- instruction for causing said processor to combine a signal received on a first set of tones by a first antenna face with a signal received on said first set of tones by a second antenna face to produce a combined signal; and
- instruction for causing said processor to extract a signal corresponding to one of a first and second wireless terminals from said combined signal to recover at least some information transmitted by at least one of said first and second wireless terminals.

23. The non-transitory computer readable medium of claim 22, further embodying machine executable instructions for causing said processor to:
- allocate said first set of tones for communication with the first wireless terminal in said sector pair state, the first set of tones being allocated in each of a first and second sector of said sector pair; and
- hopping said first set of tones over time in a synchronized manner in the sector pair.

24. An apparatus comprising:
- a memory; and
- a processor for use in a base station coupled to a multi-face antenna, said processor being configured to:
  - maintain in said memory, for each of a plurality of wireless terminals, information indicating whether an individual wireless terminal is in a sector or sector pair state;
  - communicate with a wireless terminal using a number of antenna faces determined by the state corresponding to said wireless terminal;
  - combine a signal received on a first set of tones by a first antenna face with a signal received on said first set of tones by a second antenna face to produce a combined signal; and
  - extract a signal corresponding to one of a first and second wireless terminals from said combined signal to recover at least some information transmitted by at least one of said first and second wireless terminals.

25. The apparatus of claim 24, wherein said processor is further configured to:
- allocate said first set of tones for communication with the first wireless terminal in said sector pair state, the first set of tones being allocated in each of a first and second sector of said sector pair; and hop said first set of tones over time in a synchronized manner in the sector pair.

* * * * *